TUNNEL DIODE DRIVER

Filed Jan. 5, 1961 2 Sheets-Sheet 1

INVENTOR.
Melvin M. Kaufman
BY John V. Regan
ATTORNEY

TUNNEL DIODE DRIVER

Filed Jan. 5, 1961 2 Sheets-Sheet 2

INVENTOR.
Melvin M. Kaufman
BY John V. Regan
ATTORNEY 3,050,637
Patented Aug. 21, 1962

3,050,637
TUNNEL DIODE DRIVER

Melvin M. Kaufman, Merchantville, N.J., assignor to Radio Corporation of America, a corporation of Delaware Filed Jan. 5, 1961, Ser. No. 80,794
9 Claims. (Cl. 307—88.5)

The present invention relates to a new and improved circuit for producing a driving voltage. While not restricted thereto, the circuit is especially useful for driving a tunnel diode memory of a digital computer.

There is a need in high speed memories made up of tunnel diodes or similar high speed storage elements of a driving arrangement which produces a substantial output voltage at a very low impedance level and with a very short rise time. The circuit of the present invention meets these requirements. The circuit includes a first branch circuit having a voltage controlled negative resistance element, such as a tunnel diode, and a second branch circuit having two voltage controlled negative resistance elements, which also may be tunnel diodes, in series. The tunnel diode in the first branch circuit has the higher valley voltage than at least one of the tunnel diodes in the second branch circuit and this one tunnel diode in the second branch circuit has a lower current peak than the other tunnel diode in the second branch circuit. A voltage source means is coupled to all of the tunnel diodes for applying a voltage in the forward direction to all the diodes. The two branch circuits are coupled in such manner that the voltage across the tunnel diode in the first branch can, when the tunnel diode is switched to its high state, cause direct current to flow to the two tunnel diodes in the second branch circuit. This current causes the two tunnel diodes in the second branch circuit to switch to their high state. The circuit output voltage is taken from across the two tunnel diodes in the second branch circuit. This voltage may be 10, 20 or more times higher than the voltage required to switch the tunnel diode in the first branch circuit to its high state.

The invention is described in greater detail below and is illustrated in the following drawing of which:

Figure 1:
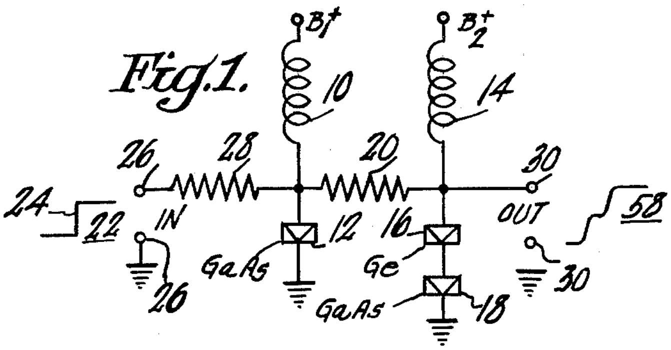
FIG. 1 is a schematic circuit diagram of one form of the present invention.

The circuit of FIG. 1 includes a voltage source legended $B_1+$ supplying a voltage to an inductor 10 in series with a gallium arsenide tunnel diode 12. It also includes a voltage source $B_2+$ in series with an inductor 14, a germanium tunnel diode 16 and a gallium arsenide tunnel diode 18. The positions of diodes 16 and 18 can, of course, be interchanged. The gallium arsenide tunnel diode 12 of the first branch is coupled to the two tunnel diodes of the second branch circuit through a direct current coupling means shown as a resistor 20. The input to the circuit consists of a direct current level 22 having a very steep leading edge 24. This wave is applied from input terminals 26, one of which is connected to a source of reference potential, such as ground, and a direct current coupling element, such as resistor 28, to the tunnel diode 12. The output from the circuit is available at terminals 30, one of which is also connected to ground.

For the circuit of FIG. 1 to operate properly, two things are essential. One is that one of the tunnel diodes in the second branch have a lower valley voltage than the tunnel diode in the first branch; the other is that the diode with the lower valley voltage in the second branch have a lower current peak than the second tunnel diode in the second branch. The circuit of FIG. 1 fulfills these conditions in that the germanium diode 16 in the second branch has a lower valley voltage than the gallium arsenide tunnel diode in the first branch and also is selected to have a lower current peak than the gallium arsenide tunnel diode 18 in the second branch.

Figure 5:
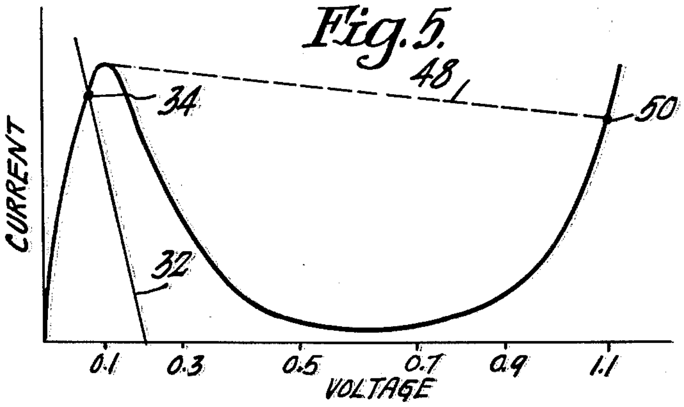
FIG. 5 is a characteristic curve of current versus voltage for a tunnel diode in one branch circuit of the circuit of FIG. 1, for example.
Figures 6, 7:
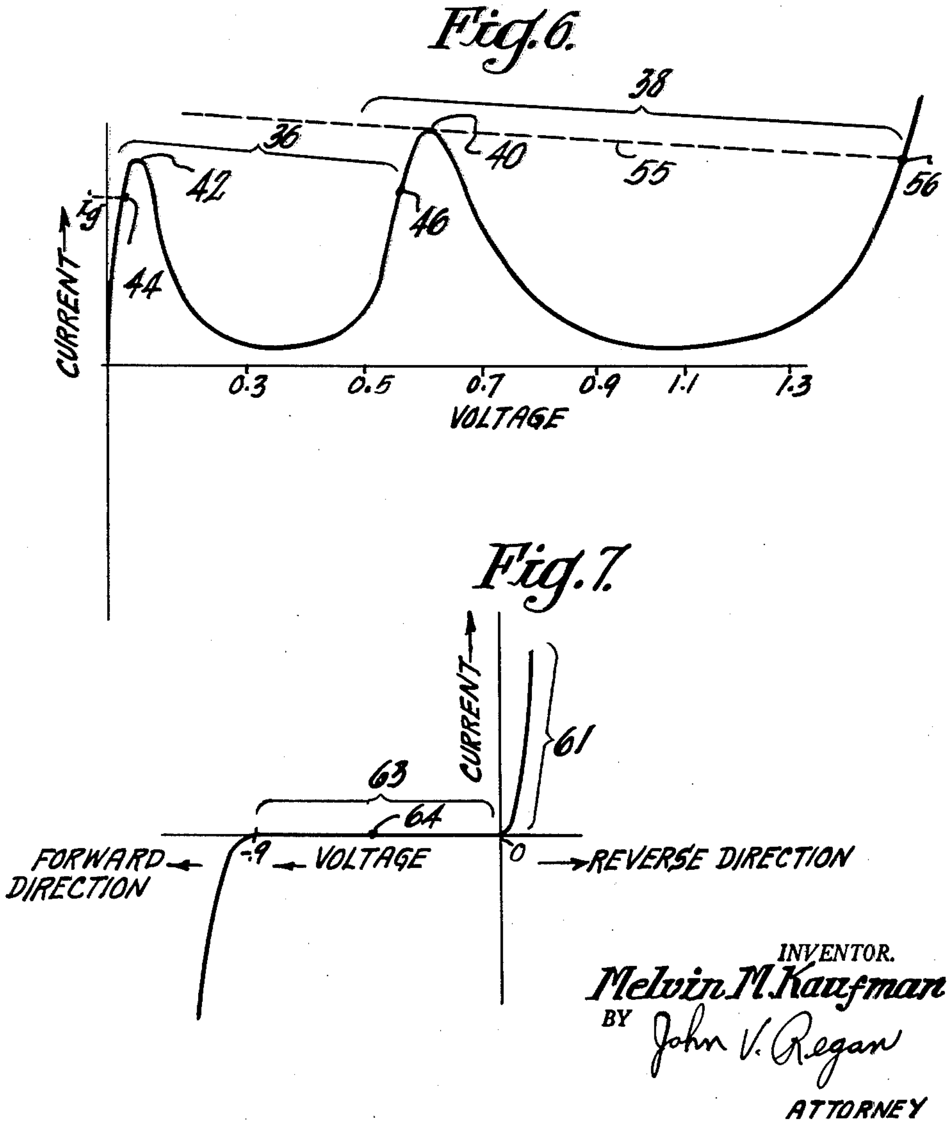
FIG. 6 is a characteristic curve of current versus voltage for two tunnel diodes such as those in the second branch circuit in FIG. 1, for example.
FIG. 7 is a characteristic curve of current versus voltage for a tunnel rectifier of the type employed in the circuit of FIG. 3.

The operation of the circuit of FIG. 1 may be better understood by referring to FIGS. 5 and 6. FIG. 5 is a characteristic curve of current versus voltage for the gallium arsenide tunnel diode 12 in the first branch circuit. As already indicated, this tunnel diode is supplied with a voltage from a substantially constant voltage source through an inductor 10. The load line for the voltage source is as indicated at 32 in FIG. 5. The quiescent voltage is such that the diode operates in its low voltage state fairly close to the current peak. This operating point is the intersection of the load line and the tunnel diode characteristic and is lengended 34.

The voltage supplied to the tunnel diodes in the second branch is such that both tunnel diodes are in the low voltage state and each is biased near the current peak of its characteristic. The composite characteristic of the two tunnel diodes in series is shown in FIG. 6. The portion 36 of the characteristic is primary due to the germanium tunnel diode 16 and the portion 38 of the characteristic is primarily due to the gallium arsenide tunnel diode 18. Note that the current peak 40 for the gallium arsenide tunnel diode is higher than the current peak 42 for the germanium tunnel diode. The quiescent current passing through both tunnel diodes is at an amplitude $i_q$. The operating point for the circuit is not easily shown in FIG. 6 but may be considered to be 44. If one diode were considered as a load on the other, one of the characteristics would be shown reversed with respect to a line parallel to the current axis and the intersection of the two curves would then be seen to be at 44, 46.

When an input pulse 22 (FIG. 1) is applied to the circuit of FIG. 1 of an amplitude sufficient to switch the tunnel diode 12 in the first branch from its low voltage state to its high voltage state, the switching would occur along some path such as dashed line 48 in FIG. 5 if no current flowed into the second branch. Current through an inductance cannot easily change and tends to remain at substantially the same value during the switching of the tunnel diode and shortly thereafter. Accordingly, when the tunnel diode switches from its low voltage state to its high voltage state, the output current available continues to "hang" at a high level of current for a considerable time after the switching pulse is applied. This high level of current is indicated at 50. The voltage across the tunnel diode 12 can be over a volt as is apparent from FIG. 5.

Initially, tunnel diodes 16 and 18 are both in the low voltage state. Accordingly, the total voltage across the two tunnel diodes is less than that required to switch these tunnel diodes and may be of the order of 140 millivolts or so. This may be distributed, for example, as 40 to 50 millivolts across the germanium tunnel diode 16 and 100 to 90 millivolts across the gallium arsenide tunnel diode 18. Note in this connection that the current peak in the germanium tunnel diode 16 occurs at about 50 millivolts and the current peak in the gallium arsenide tunnel diode 18 occurs at about 100 millivolts or so. It will be recalled that when the gallium arsenide tunnel diode 12 in the first branch switches to its high voltage state, the voltage across it can be about a volt. Accordingly, current flows from the tunnel diode 12 in the first branch through the coupling resistor 20 to the tunnel diodes 16 and 18 in the second branch. This current first causes the tunnel diode 16 in the second branch to switch from its low voltage state to its high voltage state. It will be recalled that this tunnel diode has a lower current peak than tunnel diode 18. The switching is from operating point 44 along dashed line 55.

When the germanium tunnel diode 16 switches to its high voltage state, the total voltage across the two diodes 16 and 18 may be 500 to 550 millivolts or so. The voltage across the gallium arsenide tunnel diode in the first branch can still be of the order of 1 volt or so. Accordingly, current continues to flow from the gallium arsenide tunnel diode 12 in the first branch through the coupling resistor 20 and into the two tunnel diodes 16 and 18 in the second branch. The current peak 40 of the gallium arsenide tunnel diode 18 in the second branch is also exceeded and this tunnel diode switches to its high voltage state. The switching continues along dashed line 55 to operating point 56. The voltage now available at output terminals 30 is of the order of 1500 millivolts. All the tunnel diodes are in their high voltage states. The output waveform is stepped as is shown at 58 in FIG. 1.

Summarizing, a small input pulse applied to terminals 26 produces a relatively large pulse (relatively high voltage and current) at output terminals 30. The rise time of the output pulse is very short. In a practical circuit, the parameters of which are given below, the germanium tunnel diode 16 switched to its high state is about 2 nanoseconds (millimicroseconds) and the gallium arsenide tunnel diode 18 in the second branch switched in about 3 nanoseconds. When the input pulse 22 is removed, all of the tunnel diodes 12, 16 and 18 automatically return to their original condition, that is, quiescently biased in the low voltage state. It should be recalled, in this connection, that the diodes are all biased from voltage sources and the only quiescent operating point possible is in the low voltage state of all diodes. Thus, separate reset means are not required.

When all the tunnel diodes are in their high voltage state, the voltage across the two tunnel diodes 16, 18 in the second branch is greater than the voltage across the tunnel diode 12 in the first branch and accordingly there is some current flow in the backward direction. This is undesirable as the backward current flow subtracts from the current available at the output terminals for driving the load (not shown).

Figures 2, 3, 4:
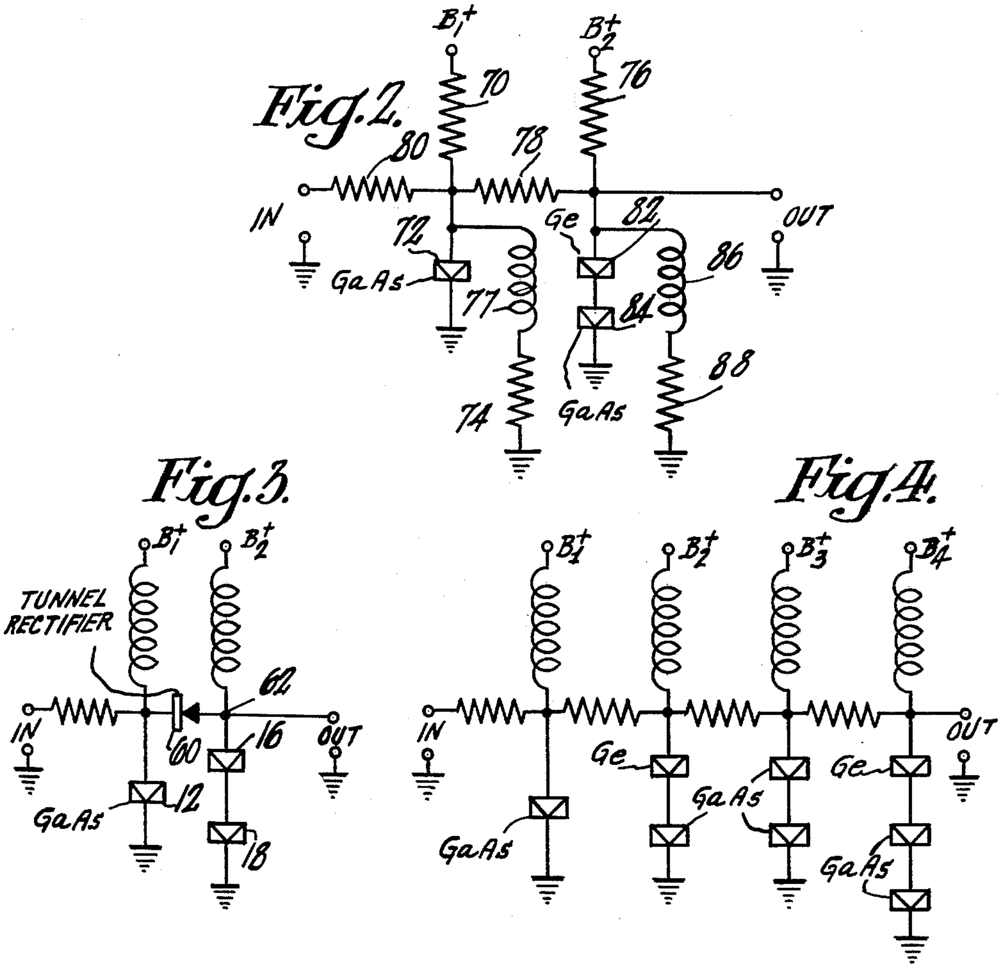
FIG. 2 is a schematic circuit diagram of a circuit similar to the one of FIG. 1 showing how the voltage sources of FIG. 1 may be simulated.
FIG. 3 is a schematic circuit diagram of another form of the present invention using a tunnel rectifier as an isolating element.
FIG. 4 is a schematic circuit diagram of another form of the present invention having several branch circuit stages.

An improved circuit which does not have this disadvantage is shown in FIG. 3. The direct current coupling element between the first and second branches is a tunnel rectifier 60 which replaces the resistor 20 of FIG. 1. Otherwise, the circuits of FIGS. 1 and 3 are the same. The tunnel rectifier 60 has a characteristic such as shown in FIG. 7. The characteristic plotted is one for a gallium arsenide tunnel rectifier. Note that the cathode of the tunnel rectifier is connected to the anode of gallium arsenide tunnel diode 12. For current flow in the direction from gallium arsenide tunnel diode 12 to the two tunnel diodes in the second branch (current flow in the reverse direction through the tunnel rectifier), the tunnel rectifier looks like a very low value of resistance (portion 61 of the curve of FIG. 7) and current easily flows through it with little loss. (Note that if a conventional diode were used poled in the forward direction from the first branch toward terminal 62, it would have high impedance at low forward voltages.) However, when current attempts to flow from terminal 62 through the tunnel rectifier in the forward direction and into the gallium arsenide tunnel diode 12, the tunnel rectifier looks like a high value of resistance (portion 63 of the curve of FIG. 7) at least for voltage differences which are less than 9/10 of a volt. It will be recalled from the previous discussion that when the second branch tunnel diodes 16 and 18 are both in the high voltage state, the voltage at terminal 62 may be at 1500 millivolts or so and the voltage across gallium arsenide tunnel diode 12 may be 1100 millivolts or so. Under these conditions, the voltage difference across the tunnel rectifier 60 is 400 to 500 millivolts as indicated by operating point 64 in FIG. 7 so that very little current can flow through the tunnel rectifier.

Many different combinations are possible for the tunnel diodes in the first and second branches. Some of these are as follows:

Tunnel diode in first branch:
(1) Gallium arsenide
(2) Gallium arsenide
(3) Gallium arsenide
(4) Gallium arsenide
(5) Silicon Tunnel diodes in second branch:
(1) Both germanium
(2) Germanium and silicon
(3) Silicon and gallium arsenide
(4) Germanium and silicon
(5) Silicon and germanium In each of the combinations above, the tunnel diode in the second branch having the lower valley voltage also has the lower current peak.

One way in which the circuit of FIG. 1 may be realized is shown in FIG. 2. The resistor 70 in series between the voltage source $B_1^+$ and the gallium arsenide tunnel diode 72 has a relatively high value so that the voltage source and resistor together constitute a substantially constant current source. A resistor 74 in series with an inductor 76 is connected across the tunnel diode 72. The resistor 74 has a relatively low value. The substantially constant current source in combination with the shunt resistance 74 simulate a constant voltage source for the tunnel diode. The second branch circuit includes a similar means, namely series resistor 76 and shunt resistor 88 for simulating a constant voltage source. A practical circuit according to FIG. 2 may have the following component values.

Resistors 70 and 76—100 ohms each
Resistor 78—25 ohms
Resistor 80—47 ohms
Resistors 74 and 88—1 ohm each
Inductors 76 and 86—.47 microhenrie each.
Gallium arsenide tunnel diodes 72 and 84—42 milliamperes current peak
Germanium tunnel diode 82—40 milliamperes current peak
$B_1^+$—14 volts
$B_2^+$—20 volts In the circuits discussed so far, there are two branch circuits and the output is taken from across the second branch. It is possible to include additional branches for further increasing output voltage. A circuit of this type is shown in FIG. 4. The first branch contains a gallium arsenide tunnel diode; the second branch includes a germanium tunnel diode and gallium arsenide tunnel diode; the third branch includes two gallium arsenide tunnel diodes; and the fourth branch includes a germanium tunnel diode and two gallium arsenide tunnel diodes. The coupling between branches is shown as resistor coupling, however, it is to be understood that other D.C. coupling means such as the tunnel rectifier shown in FIG. 3 are suitable.

The operation of the circuit of FIG. 4 is similar to that of the operation of the circuit of FIG. 1. The output wave has four steps. Its amplitude can be more than 2½ volts. Further branches could be included in the circuit with more than three tunnel diodes in order further to increase the output voltage.

What is claimed is:

1. A driver comprising, in combination, a first branch circuit including a voltage controlled negative resistance element; a second branch circuit including two voltage controlled negative resistance elements in series, the element in the first branch circuit having a higher valley voltage than at least one of the elements in the second branch circuit and said one element in the second branch circuit having a lower current peak than the other element in the second branch circuit; quiescent bias means coupled to all negative resistance elements for applying a forward bias to said elements; and a direct current coupling circuit between the two branch circuits for applying a direct current from the first branch circuit to the two elements in the second branch circuit.

2. A driver comprising, in combination, a first branch circuit including a voltage controlled negative resistance element; a second branch circuit including two voltage controlled negative resistance elements in series, the element in the first branch circuit having a higher valley voltage than at least one of the elements in the second branch circuit and said one element in the second branch circuit having a lower current peak than the other element in the second branch circuit; means coupled to all elements for applying a forward voltage to all negative resistance elements at a level to quiescently bias all elements in the voltage state; and a direct current coupling circuit between the two branch circuits for applying a direct current from the first branch circuit to the two elements in the second branch circuit.

3. A driver comprising, in combination, a first branch circuit including a voltage controlled negative resistance element; a second branch circuit including two voltage controlled negative resistance elements in series, the element in the first branch circuit having a higher valley voltage than at least one of the elements in the second branch circuit and said one element in the second branch circuit having a lower current peak than the other element in the second branch circuit; means including voltage source means and an inductor connected to each branch circuit for monostably biasing each element to its low voltage state; and a direct current coupling circuit between the two branch circuits for applying a direct current from the first branch circuit to the two elements in the second branch circuit.

4. A driver comprising, in combination, a first branch circuit including a voltage controlled negative resistance element; a second branch circuit including two voltage controlled negative resistance elements in series, the element in the first branch circuit having a higher valley voltage than at least one of the elements in the second branch circuit and said one element in the second branch circuit having a lower current peak than the other element in the second branch circuit; means including voltage source means and an inductor connected to each branch circuit for monostably biasing each element to its low voltage state; a direct current coupling circuit between the two branch circuits for applying a direct current from the first branch circuit to the two elements in the second branch circuit; a pair of input terminals coupled to the first branch circuit to which an input current may be applied for switching the element in that circuit to its high voltage state; and a pair of output terminals coupled across the two elements in the second branch circuit.

5. A tunnel diode driver comprising, in combination, a first branch circuit including a tunnel diode; a second branch circuit including two tunnel diodes in series, the tunnel diode in the first branch circuit having a higher valley voltage than at least one of the tunnel diodes in the second branch circuit and said one tunnel diode in the second branch circuit having a lower current peak than the other tunnel diode in the second branch circuit; voltage source means coupled to all tunnel diodes for applying a forward voltage to the diodes; and a direct current coupling circuit between the two branch circuits for applying a direct current from the first branch circuit to the two tunnel diodes in the second branch circuit.

6. A tunnel diode driver comprising, in combination, a first branch circuit including a tunnel diode; a second branch circuit including two tunnel diodes in series, the tunnel diode in the first branch circuit having a higher valley voltage than at least one of the tunnel diodes in the second branch circuit and said one tunnel diode in the second branch circuit having a lower current peak than the other tunnel diode in the second branch circuit; means coupled to all diodes for monostably biasing all diodes in the low voltage state; and a direct current coupling circuit between the two branch circuits for applying a direct current from the first branch circuit to the two tunnel diodes in the second branch circuit.

7. A tunnel diode driver comprising, in combination, a first branch circuit including a tunnel diode; a second branch circuit including two tunnel diodes in series, the tunnel diode in the first branch circuit having a higher valley voltage than at least one of the tunnel diodes in the second branch circuit and said one tunnel diode in the second branch circuit having a lower current peak than the other tunnel diode in the second branch circuit; voltage source means coupled to all tunnel diodes for applying a forward voltage to the diodes; and a tunnel rectifier between the two branch circuits poled in the reverse direction from the first toward the second branch circuit for applying a direct current from the first branch circuit to the two tunnel diodes in the second branch circuit.

8. A tunnel diode driver as set forth in claim 5, wherein the tunnel diode in the first branch circuit is a gallium arsenide tunnel diode and the tunnel diodes in the second branch circuit are gallium arsenide and germanium tunnel diodes, respectively.

9. A driver comprising a plurality of branch circuits, each including one or more tunnel diodes connected in series in the same direction, succeeding circuits producing successively higher voltages when the tunnel diodes in the respective circuits are in the high state, and each circuit being capable of supplying a current to the succeeding circuit at a level to switch all tunnel diodes in the succeeding circuit to the high state; means coupled to all diodes for quiescently monostably biasing all diodes to the low voltage state; a plurality of direct current coupling circuits for respectively coupling the succeeding branch circuits to one another; means coupled to the first of said branch circuits for switching the one or more tunnel diodes therein to the high voltage state; and means coupled to the last of said circuits for deriving an output voltage therefrom in response to the switching of its tunnel diodes to the high state.

No references cited.